United States Patent [19]
Fukui

[11] Patent Number: 5,626,055
[45] Date of Patent: May 6, 1997

[54] ELECTRICALLY-DRIVEN THRUST GENERATOR

[75] Inventor: Kiyozumi Fukui, Tokyo, Japan

[73] Assignee: Teijin Seiki Co., Ltd., Japan

[21] Appl. No.: 438,712

[22] Filed: May 11, 1995

[30] Foreign Application Priority Data

May 12, 1994 [JP] Japan .................................. 6-122059

[51] Int. Cl.$^6$ ................................................. F16H 29/22
[52] U.S. Cl. ........................... 74/116; 74/337; 74/640; 192/146; 477/9
[58] Field of Search ........................... 74/116, 337, 640; 192/34, 146; 477/8, 9

[56] References Cited

U.S. PATENT DOCUMENTS

| 942,913 | 12/1909 | Keller | 74/337 |
|---|---|---|---|
| 4,648,756 | 3/1987 | Alexander et al. | 408/9 |
| 4,822,215 | 4/1989 | Alexander | 408/9 |
| 5,187,994 | 2/1993 | Hirai et al. | 74/116 X |

Primary Examiner—Allan D. Herrmann
Attorney, Agent, or Firm—Ostrolenk, Faber, Gerb & Soffen, LLP

[57] ABSTRACT

An electrically-driven thrust generator is provided, which can contribute energy saving, and has properties (thrust controllability, swift action etc.) equivalent to hydraulic cylinders and contributes to solve problems (leakage etc.) associated with oil pipings. The electrically-driven thrust generator comprises a motor 3, a variable reduction ratio speed reducers 5, a rotary motion to linear motion converting mechanism 7, a thrust rod 121 linearly driven by this rotary motion to linear motion converting mechanism 7. The present invention is characterized in that the rotary motion to linear motion converting mechanism 7 comprises an oscillating crank plate driven rack mechanism, which provides a compact and powerful electrically-driven thrust generator equivalent to hydraulic thrust generator.

25 Claims, 9 Drawing Sheets

ELECTRICALLY-DRIVEN THRUST GENERATOR

FIELD OF THE INVENTION

The present invention relates to an electrically-driven thrust generator utilized for, for instance, clamping devices for fixing works to be machined by machine tools, specifically to an electrically-driven thrust generator having advantages of low electric power consumption.

1. Background of the Invention

Prior art in the field of the present invention will now be described taking work clamp devices as an example. So far, hydraulic cylinders have been generally used for feeding work clamps in machine tools. Considering strong thrust produced, hydraulic cylinders are compact and economical. And also, the motion of hydraulic cylinders is sufficiently fast and the thrust produced by the cylinder is easily calculated from the cross section of cylinders and the pressure applied therto. In consequence, hydraulic cylinders have been widely used for machine tool clamps as thrust generators with high precision and excellent performance.

2. Object of the Invention

However, since a trend laying strength on energy saving has been strong, such a fact could not be neglected that clamp devices using hydraulic cylinders are very poor in energy efficiency. According to an estimate in a machine manufacturing factory with numerous machine tools, electric power consumption of the factory would be reduced to half if hydraulic systems for machine tools were replaced by electric systems. In the above-mentioned factory, since most of the hydraulic power is consumed for hydraulic clamps, it is very profitable to convert hydraulic clamps into electrically-driven clamps. And additionally, ordinary machine tools employing a number of hydraulic cylinders are generally equipped with complicated hydraulic pipings, accordingly, around machine tools, there are huge numbers of hydraulic couplings. It is actually impossible to completely get rid of leaks from these couplings, and the oil leakage is generally observed around machine tools under long operation, which makes the factory dirty and dangerous. Solutions to these problems associated with oil leakage have been keenly desired.

It is an object of the present invention to provide an electrically-driven thrust generator which can contribute energy saving, and has properties (thrust controllability, swift action etc.) equivalent to hydraulic cylinders and contributes to solve problems (leakage etc.) associated with oil pipings.

SUMMARY OF THE INVENTION

In order to achieve the above objects, the electrically-driven thrust generator of the present invention comprises: an electrically driven motor, a variable reduction ratio speed reducers for reducing rotation of the motor; a rotary motion to linear motion converting mechanism for converting rotary motion as an output of the speed reducer to linear motion; and a thrust rod linearly driven by this rotary motion to linear motion converting mechanism, wherein thrust is applied to a work by pushing the thrust rod to a work: characterized in that said rotary motion to linear motion converting mechanism comprises an oscillating crank plate driven rack mechanism.

The rotation of the motor is reduced by the speed reducer, then transmitted to the rotary motion to linear motion converting mechanism and is converted into linear motion. This linear motion is transmitted to the thrust rod and the thrust is applied to the work when the thrust rod is pushed on the work. The speed reducer has variable reduction ratio capable of changing feed speed of the thrust rod between fast and slow. The reason whey the oscillating crank plate rack mechanism is adopted to the rotary motion to linear motion converting mechanism is, as described in detail afterwards, to provide a compact and powerful electrically-driven thrust generator competitive with hydraulic thrust generators.

Preferably, the electrically-driven thrust generator of the present invention further comprises: a thrust detector which detects thrust of the thrust rod to detect a touch of the thrust rod to the work when the thrust reaches a first threshold value, and to detect a desired thrust when the thrust reaches a second threshold value; a reduction ratio changer maintaining a reduction ratio of the variable reduction ratio speed reducer at low to feed the thrust rod fast, and changing the reduction ratio of said speed reducer into high to feed the thrust rod slowly but forcefully; and a motor controller which stops the motor when the desired thrust is achieved.

More preferably, the electrically-driven thrust generator of the present invention further comprises a thrust lowering restraining means which restrains the thrust of the thrust rod from lowering after the motor has stopped.

When the thrust rod touches the work, reaction from the work produces stronger thrust in the thrust rod and produces stronger shaft torque in speed reducer's shafts or motor shafts. Accordingly, in case that the thrust of the thrust rod is directly detected or indirectly detected from shaft torque, work touch may be detected. In addition, by stopping the motor and locking the electrically-driven thrust generator by means of the thrust lowering restraining means such as motor brakes when a predetermined thrust has been obtained, the thrust rod may be maintained in a state that the thrust rod is pushed to the work with a thrust stronger than a certain level.

While work touch is not detected, the thrust rod (the rotary motion linear motion converting mechanism) under light load is fed fast (low reduction ratio) to feed the thrust rod swiftly thereby speeding up the electrically-driven thrust generator. After the work touches, the reduction ratio is changed into high to feed the thrust rod slowly and with strong thrust thereby obtaining a predetermined thrust.

The electrically-driven thrust generator according to the present invention preferably further comprises a shock softening means for softening a shock generated when the work touches the thrust rod. When both the work and the thrust generator (work cramp) are provided with considerable stiffness, slight fluctuation of time between the work touch and the stoppage of the motor causes very large fluctuation of thrust, resulting in practical problem. Therefore, a shock softening means such as springs is attached to the thrust generator to gradually rise the thrust generated with respect to the strokes (time) of the thrust rod after the work touches it, which maintains practically allowable fluctuation of the thrust. This shock softening means also prevents the device from being destroyed when the thrust rod contacts the work and the thrust and the shaft torque are excessively increased due to the shock. Further, it may be possible to measure the thrust of the thrust rod by detecting the deflection of springs or the like which composes the shock softening means.

The motor of the electrically-driven thrust generator of the present invention may be elastically supported in the rotational direction, and by detecting the rotation angle of the motor, the thrust detector detects output torque of the motor and finally the thrust of the thrust rod. Such a design is advantageous to obtain a reliable generator.

In the electrically-driven thrust generator of the present invention, the shock softening means may be an elastic member provided in the thrust rod. It is preferable to absorb shocks at a position close to the work for the protection of the device.

In the electrically-driven thrust generator of the present invention, the motor may be a motor with brake, and the brake forms the thrust lowering restraining means. Such construction is the simplest. General type of motors with brakes for such use are equipped with springs for braking and electromagnets for unbraking when power is applied to the electromagnet.

In the electrically-driven thrust generator of the present invention, the high reduction ratio speed reducer mechanism may be an elastic spline type speed reducing mechanism, or a similar type mechanism such as a coaxial type high reduction ratio speed reducing mechanism or a differential gear type reducing mechanism. These speed reducers provide compactness and high reduction ratio at the same time. Examples of these types of high reduction ratio speed reducer are FLEX-DRIVE transmissions (trade name), HARMONIC-DRIVE transmissions (trade name) and industrial differential gear type transmissions with high reduction ratio.

In the electrically-driven thrust generator of the present invention, the reduction ratio changer in said speed reducer may include a teeth and/or claw clutch, or a friction clutch. Among them, teeth clutches are preferable in possibility of size reduction and from economical point of view. On the other hand, the friction type is superior in smooth engaging/disengaging.

BRIEF DESCRIPTION OF THE DRAWINGS

The present invention will be more apparent from the ensuring description with reference to the accompanying drawings wherein.

EMBODIMENT

Figure 1:
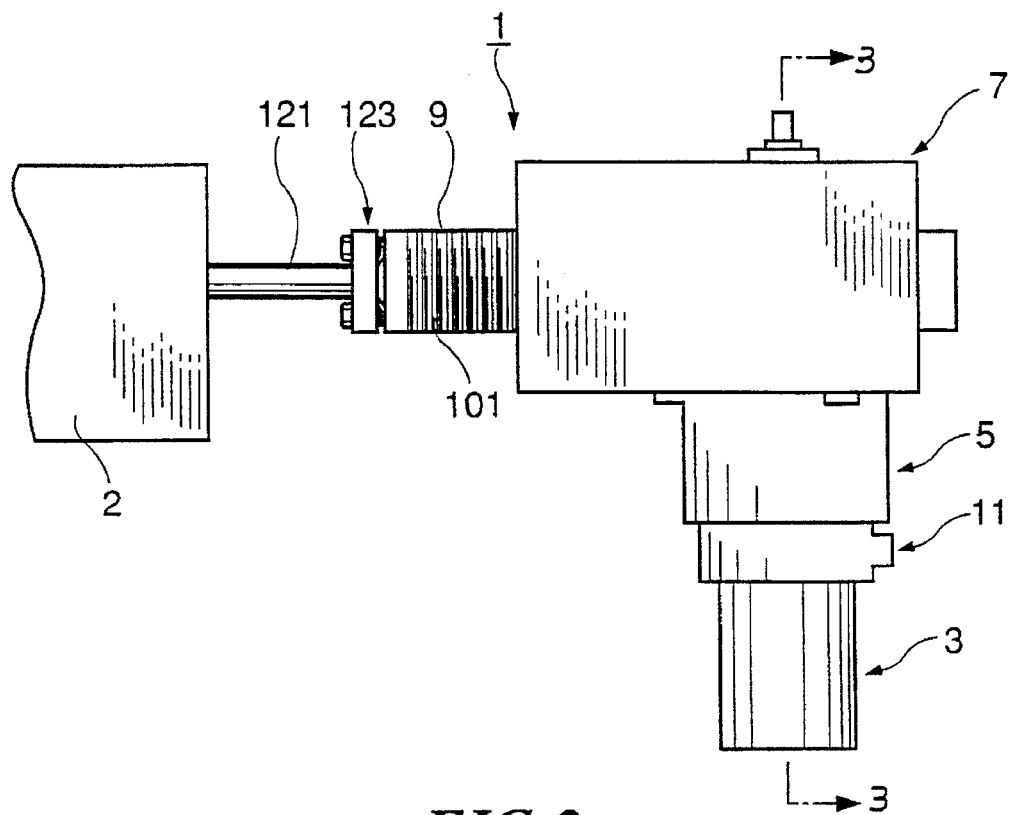
FIG. 1 is a top plan view of an electrically-driven thrust generator according to an embodiment of the present invention.

Referring to FIG. 1, the outline of an electrically-driven thrust generator according to an embodiment of the present invention will now be described. This electrically-driven thrust generator 1 pushes a thrust rod head 121 to a work 2. The thrust rod head 121 is connected to a thrust rod (rack) 9 with an elastic portion 123. The thrust rod 9 is fed forward and backward by a rotary motion to linear motion converting mechanism 7. The rotary motion to linear motion converting mechanism 7 is supplied with rotational power by a motor 3 via a variable reduction ratio speed reducer 5. By changing reduction ratio of variable reduction ratio speed reducer 5, feeding mode of the thrust rod 9 is changed between a mode of high speed under low load (small thrust) and another mode of low speed under high load (large thrust). A thrust detector 11 is provided to detect shaft torque of the motor 3 (finally thrust of the thrust rod) and consequently to be able to control feeding mode of the thrust rod 9 and stop of the motor 3. Before the thrust rod head 121 touches the work 2, the thrust rod 9 is fed fast, and after a work touches the head 121 the thrust rod 9 is fed slowly. The elastic portion 123 is provided for slowly rising the thrust when a work abuts the head 121 and for providing enough time for the generator to stop at a torque close to the target, and at the same time, for softening a shock at the abutment of the work.

Figure 3:
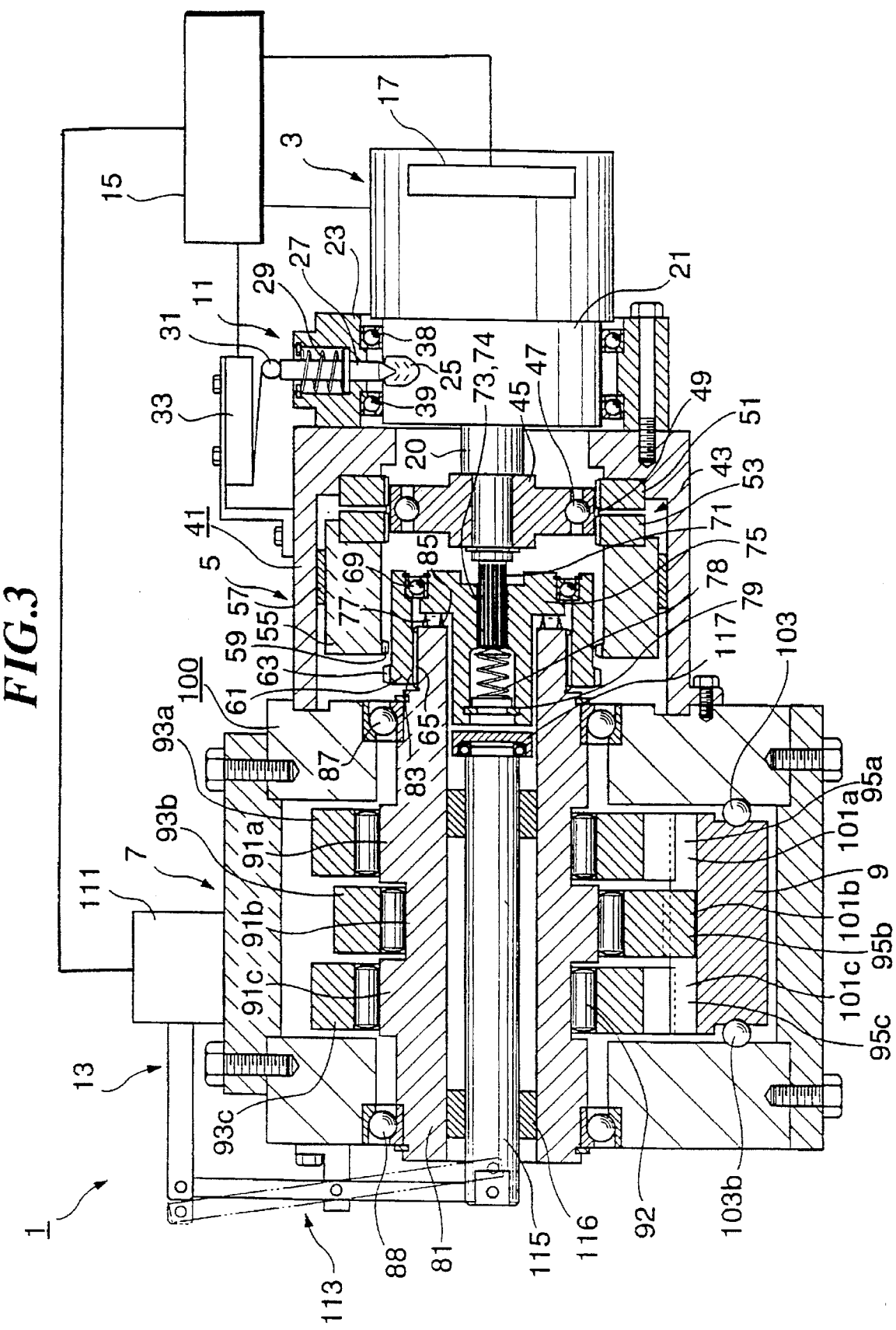
FIG. 3 is a cross sectional view taken along line 3—3 in FIG. 1 showing an internal structure of main part of the electrically-driven thrust generator.

Referring now to FIG. 3, internal structure of the electrically-driven thrust generator is described. FIG. 3 shows a cross sectional view taken along the line 3—3 of FIG. 1. As described above, the electrically-driven thrust generator of the present invention comprises, as its main parts, from right to left in the FIG. 3, the motor 3, the thrust detector 11, the variable reduction ratio speed reducer 5, the rotary motion to linear motion converting mechanism 7 and the thrust rod (rack) 9. The electrically-driven thrust generator of FIG. 3 belongs to a type wherein the speed reducer 5 is coaxially connected to a crank shaft 81 of the rotary motion to linear motion converting mechanism 7 and the crank shaft 81 is formed to have a hollow center, in which a reduction ratio changer rod 115 is disposed.

The motor 3 is an induction motor and is provided with a brake 17, which works as a thrust lowering restraining means of the electrically-driven thrust generator 1. The brake 17 is activated by the motor controller 15 to fix the thrust and torque in the electrically-driven thrust generator 1 when the thrust of the thrust rod 9 reached a predetermined value, and then the motor 3 stops. With this control, the thrust rod 9 may be maintained being pushed to the work 2 with little electric consumption.

Figure 4:
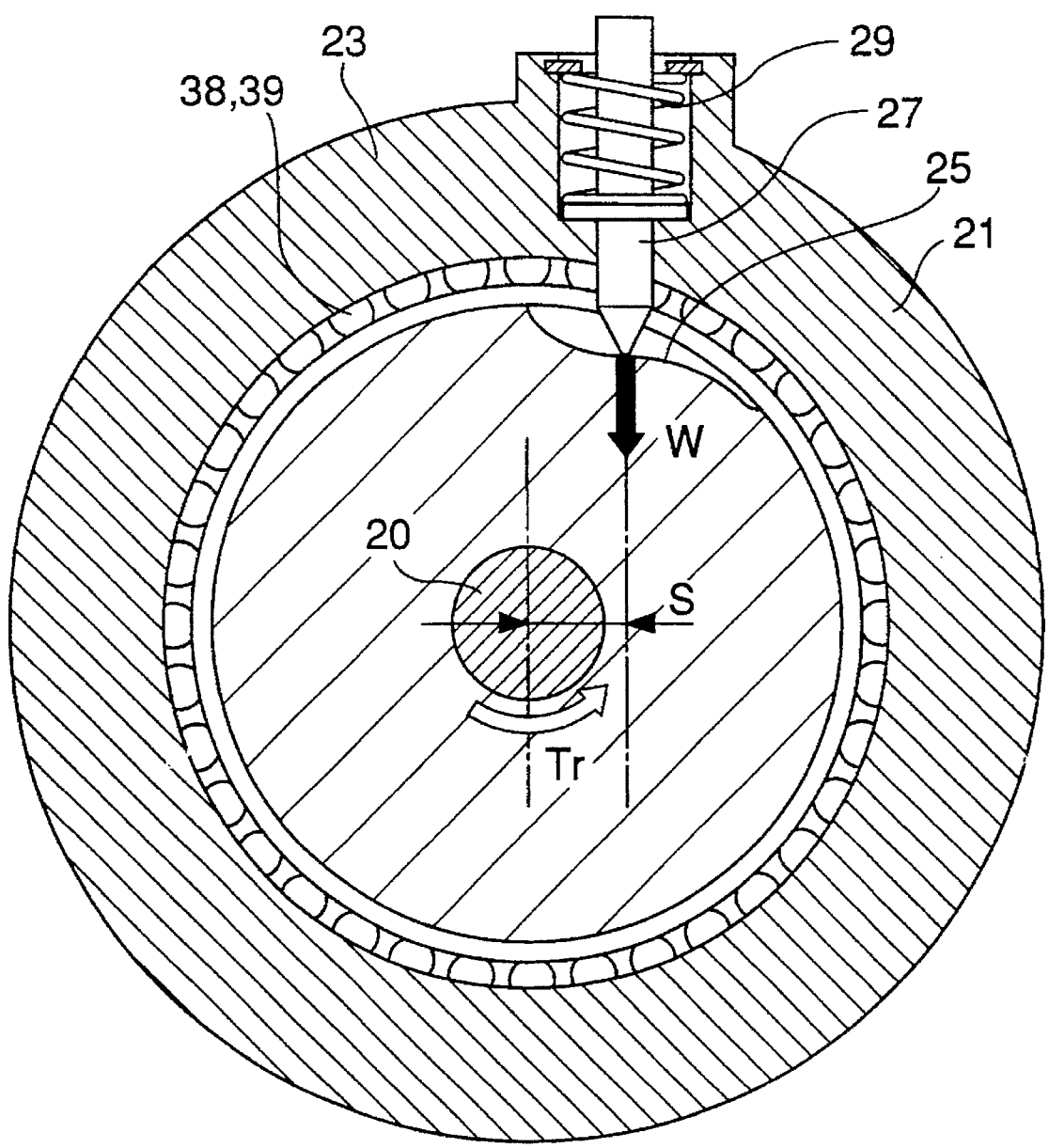
FIG. 4 is a schematic front view showing the supporting structure for the motor shown in FIG. 3.

The motor 3 is rotatably supported by a support block 23 via bearings 38 and 39 at its grooved ring portion 21. As shown in a schematic front view of FIG. 4, the motor 3 is elastically supported in a rotational direction of a motor shaft 20 by a elastic support member 29 (spring) and a lift pin 27. Accordingly, when a torque is applied to the motor shaft 20, force W applied to the spring 29, wherein W=Tr (torque)/S(torque arm length), varies to cause the spring to deflect, which causes the motor 3 to rotate by a certain angle with respect to the support block 23.

Next, the thrust detector 11 will now be described. As described above, when the motor 3 and the connected grooved ring portion 21 rotates together, the tapered groove 25 formed on the upper surface of the grooved ring portion 21 rotates. The tapered groove 25 is of a tapered bottom. A lift pin 27 for measuring the rotational angle of the motor angle is urged to this tapered groove 25 by the spring 29.

When the tapered groove 25 rotates in accordance with the rotation of the motor 3 and the grooved ring portion 21, the depth of the groove at a point where the bottom of the lift pin 27 abuts is altered to cause the height of lift pin 27 to change. This height alteration is to be detected by a pin position sensor 33 via a lever 31. Thus, the rotational angle of the motor 3 may be detected and output torque of the motor 3 may be calculated based on the rotational angle, the spring constant of the spring 29 and torque arm length etc. In a quasistatic state, there exists a certain relation between the output torque of the motor 3 and the thrust of the thrust rod 9, then the thrust of the thrust rod 9 may be calculated from the torque of the motor 3.

Figure 5:
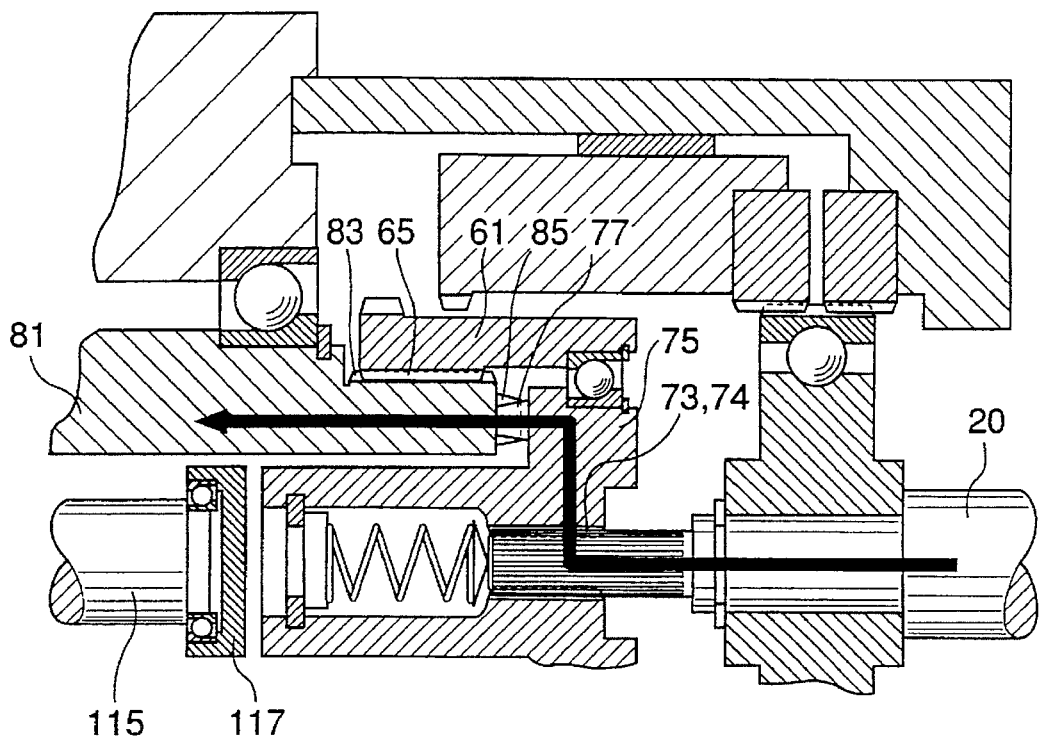
FIG. 5 is a detail cross sectional view showing the speed reducer shown in FIG. 3 in a state of low reduction ratio operation.

Next, the variable reduction ratio speed reducer 5 is described. The speed reducer 5 in this embodiment can change reduction ratio in two stages. In low reduction ratio (high speed rotation) mode, as shown in the detailed cross sectional view of FIG. 5, rotational power is transmitted from the motor shaft 20 to an extension shaft 71 extending from the shaft 20 to the left, to a spline 73 formed on an external periphery of the extension shaft 71, to a spline 74 engaging the spline 73 formed on the internal periphery of a slide boss 75, to the slide boss 75, to a side face gear 77 formed on a left side surface (crank shaft 81 side) of the slide boss 75, to a side face gear 85 meshing the side face gear 77, and to the crank shaft 81. The reduction ratio of this transmission is 1.

Figure 6:
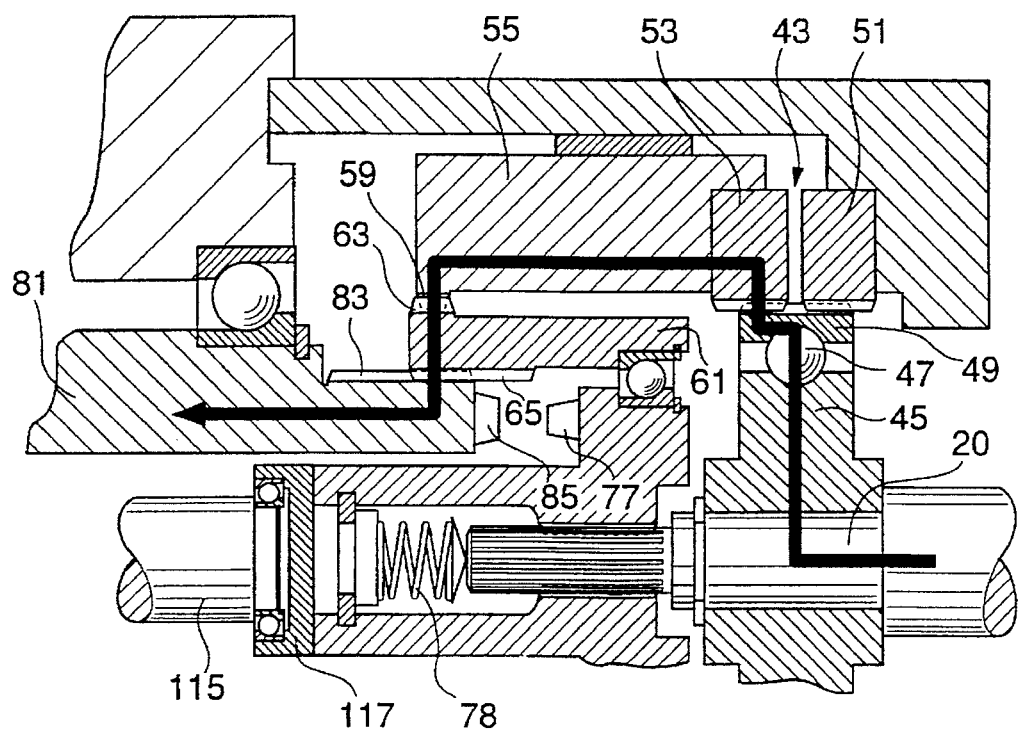
FIG. 6 is a detail cross sectional view showing the speed reducer shown in FIG. 3 in a state of high reduction ratio operation.

In high reduction ratio (low speed rotation) mode, as shown in detailed cross sectional view of FIG. 6, rotational power is transmitted from the motor shaft 20 to the high reduction ratio speed reducer 43 (flex drive type speed reducer, from a wave generator 45 to a roller bearing 47, to a flexible spline 49, to No. 1 circular spline 51, to No. 2 circular spline 53), to a low speed internal gear ring 55, to internal gear teeth 59 of the gear ring 55, to an external gear 63 of slide gear ring 61 meshing with the internal gear teeth 59, to an internal spline 65 formed on the internal periphery of the slide gear ring 61, to an external spline 83 of the crank shaft 81, and to the crank shaft 81. The reduction ratio of this transmission is the reduction ratio of the high reduction ratio speed reducer 43 (for example one several tenth to one several hundredth). Details of this high reduction ratio speed reducer will be described later.

Next, the reduction ratio changer of the speed reducer 5 is described referring again to FIG. 3. Changing of reduction ratio is carried out by integrally and axially sliding the slide boss 75 and the slide gear ring 61 right and left in the figure. That is to say, when said two parts are positioned at a left slide end (the position illustrated in FIGS. 3 and 5), the side face gear 77 of the slide boss 75 meshes with the side face gear 85 of the crank shaft 81, which provides a low reduction ratio. On the other hand, when the slide boss 75 and the slide gear ring 61 are positioned at a right slide end, the meshing between them resolved and the external gear 63 of the slide gear ring 61 meshes the internal gear 59 of the low speed internal gear ring 55, thus transmitting rotational power through the high reduction ratio speed reducer to provide high reduction ratio.

The lateral sliding of slide boss 75 and slide gear ring 61 described above are carried out by a solenoid 111, a link 113 and a changer rod 115. That is to say, when the rod of the solenoid 111 goes out left, the changer rod 115 is pushed toward right by the link 113. A rotatable plate 117 is rotatably attached to a right end (the speed reducer 5 side) of the changer rod 115. The changer rod 115 pushes the slide boss 75 toward right via this plate 117. Thus, as described above, the speed reducer 5 is switched into high reduction ratio mode.

When the changer rod 115 moves left, a spring 78 attached to the slide boss 75 pushes the slide boss 75 via a snap ring 79 which is set in the internal periphery of the slide boss 75, thus switching the speed reducer 5 into low reduction ratio mode. The slide boss 75 and the extension shaft 71 of the motor are laterally slidable to each other by splines 73 and 74.

The slide boss 75 and the slide gear ring 61 are relatively rotatable and laterally unslidable to each other. (The end face of the bearing 69 is fixed by a snap ring or the like.) The slide gear ring 61 and the crank shaft 81 are laterally slidable to each other by splines 65 and 83. The low speed internal gear ring 55 is rotatably supported by a plane bearing 57 to a casing 41 of the speed reducer. The changer rod 115 is provided in the crank shaft 81 slidably in the lateral direction but not rotatable via the baring 116. The solenoid 111 and the link 113 are attached to the casing 100 of the rotary motion to linear motion converting mechanism.

The high reduction ratio speed reducer 43 will now be described. The high reduction ratio speed reducer 43 of this embodiment is well known as the Strain Wave Gearing (by the trade name of Harmonic Drive Transmission or Flex Drive Transmission). This type of speed reducers are explained in detail in U.S. Pat. No. 2,906,143 and U.S. Pat. No. 4,524,639 etc.

As specifically shown in FIG. 6, the wave generator 45 rotates in accordance with the rotation of the motor shaft 20. The wave generator 45 has an external periphery formed in elliptical shape like a cam. The roller bearing 47 is assembled so as to fit the external periphery of the wave generator 45. The flexible spline 49 is assembled so as to fit the external periphery of the roller bearing 47. The flexible spline 49 is made of flexible material and has an elastic spline with a lot of teeth on the external periphery thereof. A part of spline teeth on the external periphery of the flexible spline 49 meshes the internal spline teeth of the first and second circular splines 51 and 53. The rotation of the wave generator 45 causes the second circular spline 53 to move little by little (by an angle corresponding to a differential number of teeth between the first and second circular splines 51 and 53, that is, one several tenth to one several hundredth revolution to one revolution of the wave generator 45). Through this motion, the high speed rotation of the wave generator 45 is reduced into low speed rotation of the second circular spline 53.

Next, the rotary motion to linear motion converting mechanism 7 will now be described. The rotary motion to linear motion converting mechanism 7 of this embodiment comprises an oscillating crank plate 93a, 93b, 93c having an active rack 95a, 95b, 95c, which drives a passive rack 101a, 101b, 101c. This type of rotary motion to linear motion converting mechanisms is described in detail in U.S. Pat. No. 5,187,994 and E. P. Publication 0482827B1 assigned to the same applicant (assigner) of the present application.

The crank shaft 81 of the rotary motion to linear motion converting mechanism 7 is, as described above, driven by the motor 3 via the speed reducer 5. The crank shaft 81 is supported by bearings 87 and 88 fixed to the casing 100. The crank shaft 81 has, at its central portion, three disc-like eccentric cams 91a, 91b, 91c. Oscillating crank plates 93a, 93b, 93c are mounted on the external periphery of the eccentric cams 91a, 91b, 91c via rollers 92. The oscillating crank plates 93 oscillate up and down and in the direction normal to the figure in accordance with the rotation of the eccentric cams 91. This action of the crank plate 93 oscillates the active racks 95 formed on a bottom surface of the oscillating crank plates 93 to cause the passive racks 101 on a top surface of the thrust rod (rack) 9 to move in the direction normal to the figure.

A lot of balls 103 are guided to and accommodated in a groove between the let and right side faces of the thrust rod 9 and the casing 100. These balls 103 smoothly support and guide the thrust rod 9 like a linear bearing. The balls circulate through a circulation pass (not shown) formed in the casing 100.

Figure 7:
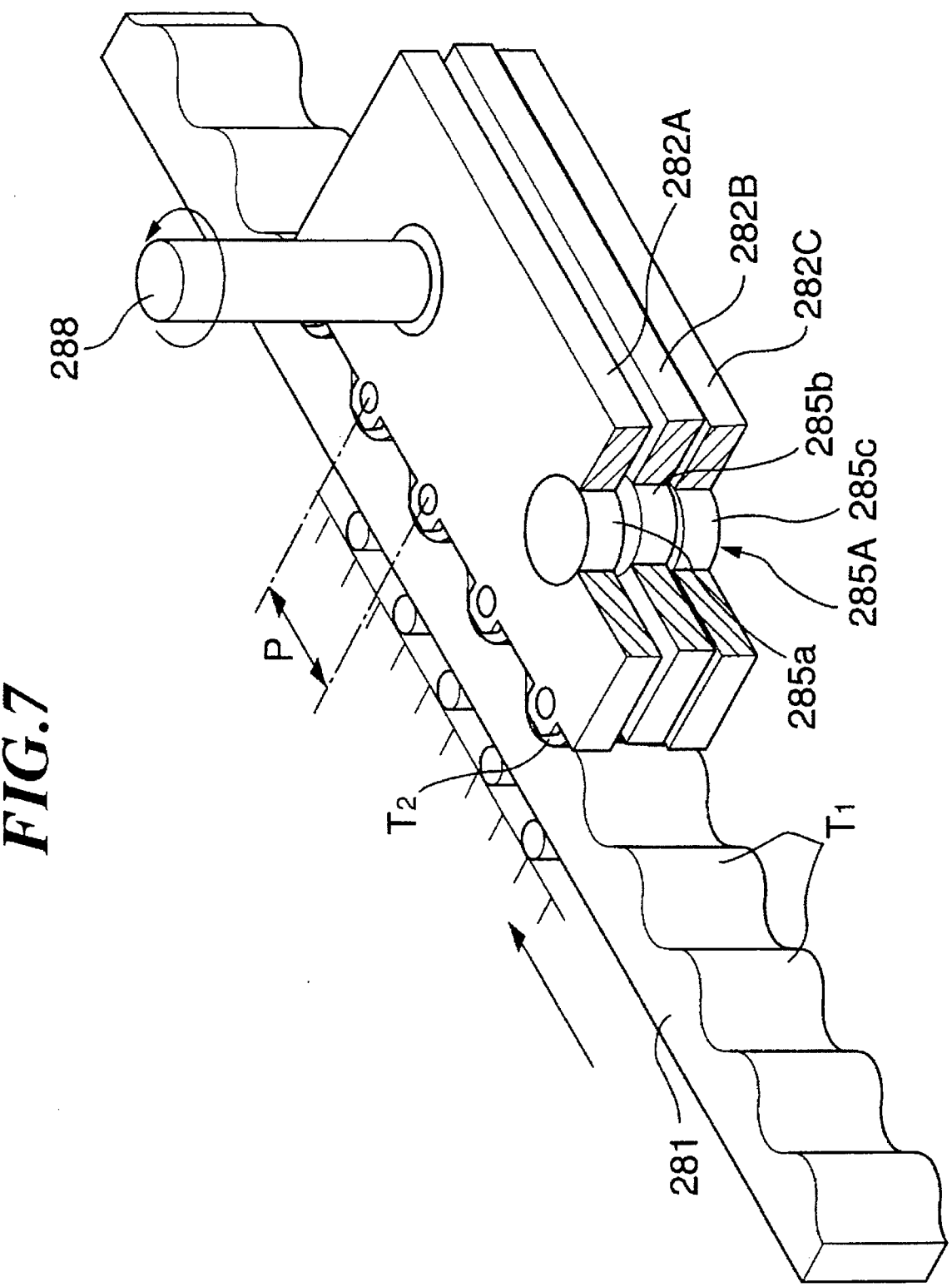
FIG. 7 is a perspective view of the rotary motion in linear motion converting mechanism of the electrically-driven thrust generator shown in FIG. 3.
Figure 8:
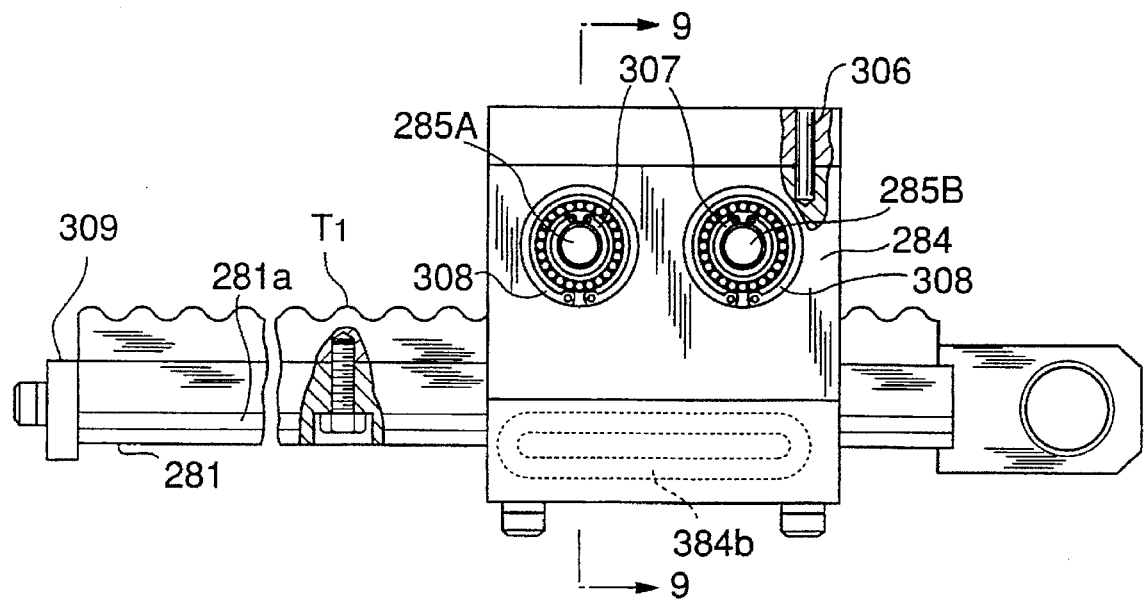
FIG. 8 is a side view illustrating external appearance of the rotary motion to linear motion converting mechanism of FIG. 7.
Figure 9:
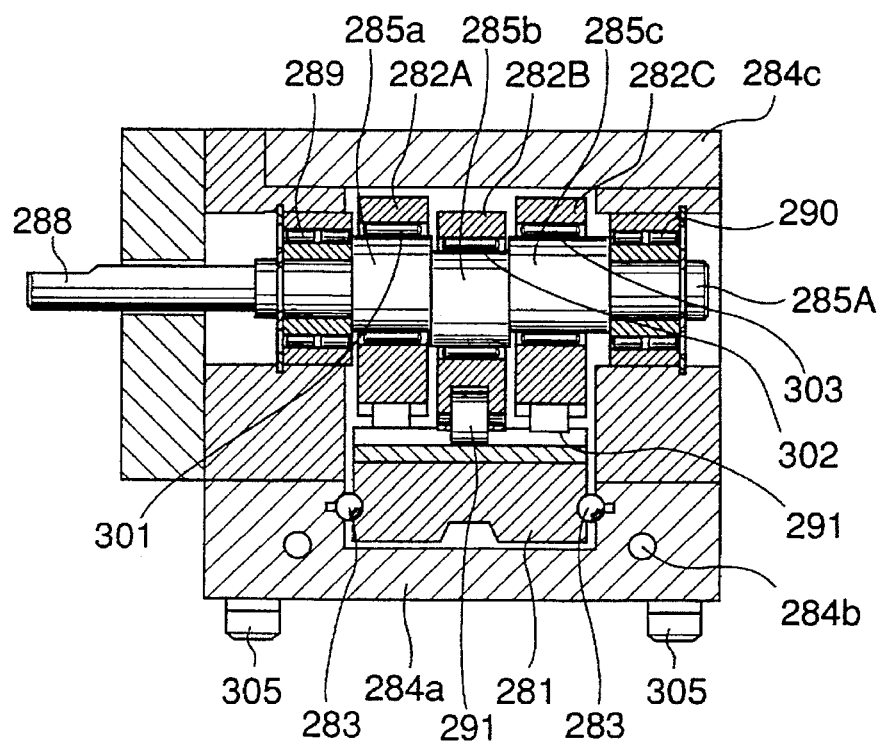
FIG. 9 is a cross sectional view taken substantially along line 9—9 of FIG. 8.
Figure 10:
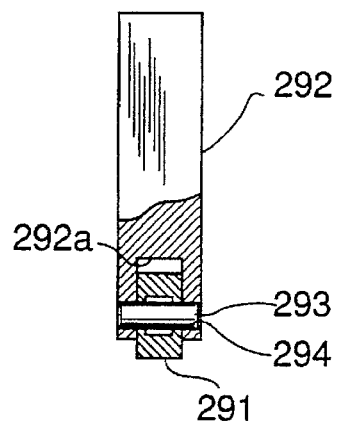
FIG. 10 is an end view, partly in section, showing one of the active racks shown in FIG. 7.
Figure 11:
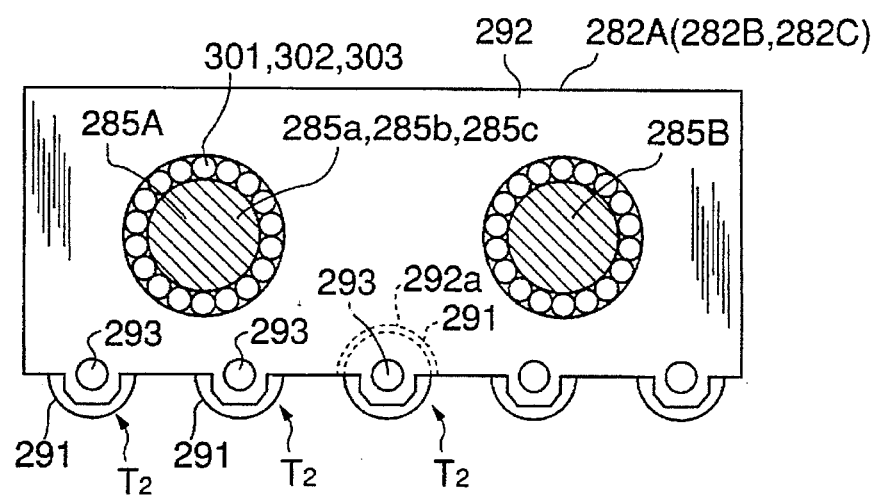
FIG. 11 is a side elevational view of the active racks shown in FIG. 7.
Figure 12:
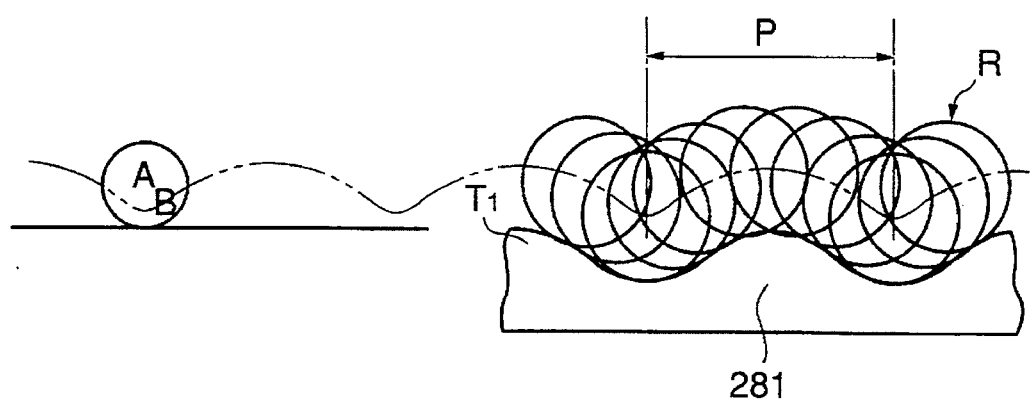
FIG. 12 is a longitudinal sectional view illustrating the gear-tooth profile of the passive rack of FIG. 7.

FIGS. 7 to 13 illustrate details of the rotary motion to linear motion converting mechanism which may be applied to an electrically-driven thrust generator of the present invention. Reference numeral 281 denotes a passive rack with a plurality of teeth T1, and reference numerals 282A, 282B and 282C denote a plurality of active racks, each of which is formed with a plurality of teeth T2 having the same pitch P as that of the teeth T1 of the passive rack 281. In this specific mechanism, the active racks comprise three active racks. The teeth T1 of the passive rack 281 are in the form of trochoidal or cycloidal (wave) gear-tooth profile as shown in FIG. 12. The teeth T2 of the active racks 282A, 282B, and 282C are in the form of semicircular arc gear-tooth profile having the same radius R as that of a base circle of the gear-tooth profile of the teeth T1. The semicircular arc gear-tooth profile will hereinafter be described in detail. As shown in FIG. 9, the passive rack 281 is supported through a plurality of balls 283 of the circulation type to a casing 284 so that it can move in the longitudinal direction thereof. The passive rack 281 is formed at its opposite side portions with linear grooves 281a in which the balls 283 are received, and the bottom portion 284a of the casing 284 is formed with ball circulation passageways 284b and 284b. The active racks 282A, 282B and 282C are supported on the eccentric circular portions (cams) 285a, 285b and 285c (FIG. 7) of a pair of crankshafts 285A and 285B in such a manner that the teeth T2 of the racks 282A, 282B and 282C are brought into engagement with the passive rack 281. Each of the crankshafts 285A and 285B is rotatably supported on the casing 284 through a pair of bearings 289 and 290. The eccentric circular portions 284a, 285b and 285c of each crankshaft are formed equiangularly, and the crankshafts 285A and 285B are connected at their one end with an input shaft 288. Therefore, when the input shaft 288 rotates, the crank shafts 285A, 285B are rotated, so that the active racks 282A, 282B and 282C are osculated while maintaining a predetermined phase difference. The predetermined phase difference is determined by the number of active racks. Therefore, in this embodiment the phase difference is 120 degrees. The rotary motions of the active racks 282A, 282B and 282C different in phase from one another cause the passive rack 281 to move in the longitudinal direction thereof. The input shaft 288 has its one end, which protrudes outwardly from the casing 284 and through which rotary input is provided.

As is shown in FIGS. 10 and 11, the individual tooth T2 of the active racks 282A–282C is constituted by a roller 291 having the above mentioned radius R. A plurality of rollers 291 are inserted into a linear groove 292a of the individual rack in such a manner that they are freely rotatably supported through needle rollers 294 on pins 293 mounted in the active rack, respectively. The rollers are for preventing wear and sticking of the teeth.

In FIGS. 7 to 9, reference numerals 301, 302 and 303 denote needle bearings interposed between the active rack 282A and the eccentric circular portion 285a of the crankshaft 285A, between the active rack 282B and the eccentric circular portion 285b of the crankshaft 285A, and between the active rack 282C and the eccentric circular portion 285c of the crankshaft 285A, respectively. Reference numerals 305 and 305 are bolts by which the bottom portion 284a of the casing 284 is fixed. Reference numeral 306 is a pin by which the top portion 284c of the casing 284 is fixed. Reference numerals 307 and 308 are retaining rings for regulating axial movement between the casing 284 and the crankshafts 285A, 285B through bearings 289 and 290. Reference numeral 309 is a stop ring by which the moving end of the passive rack 281 is determined.

The operation of the mechanism of FIG. 7 will hereinafter be described in detail.

Figure 13A:
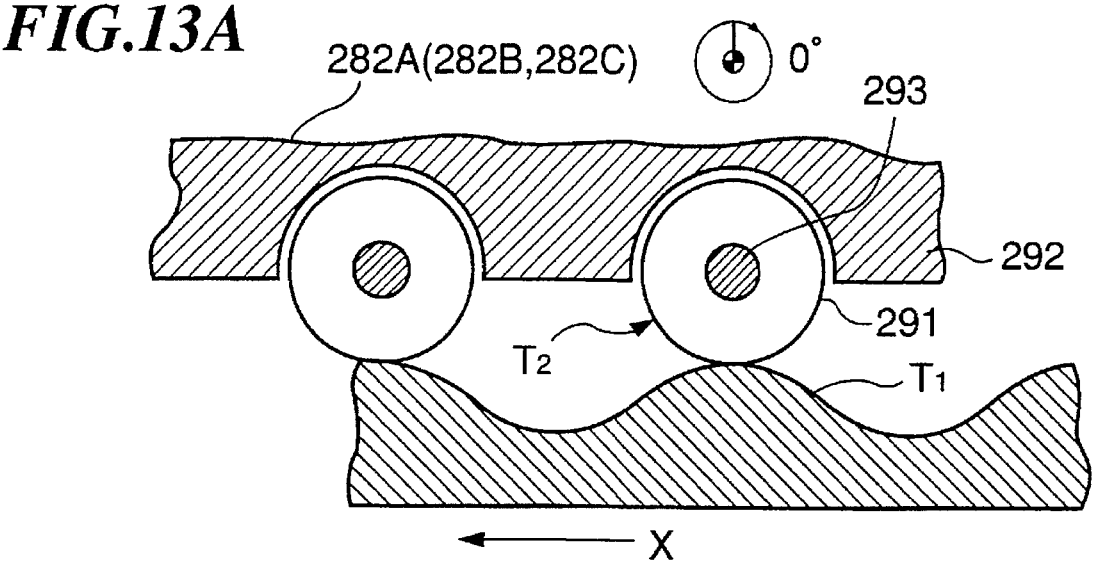
FIGS. 13(a) to 13(c) are partially sectional views illustrating how the passive rack is moved in its longitudinal direction by the active racks, respectively.
Figure 13B:
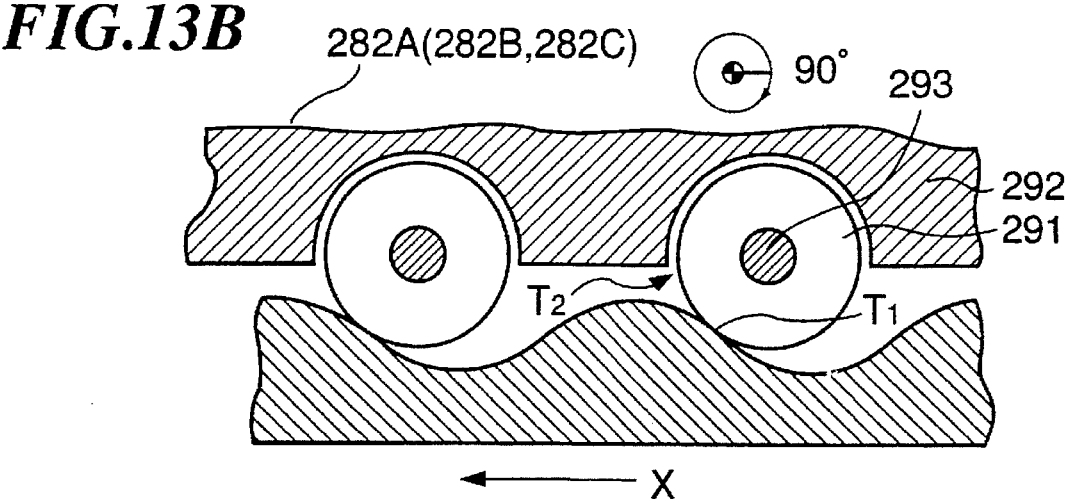
Figure 13C:
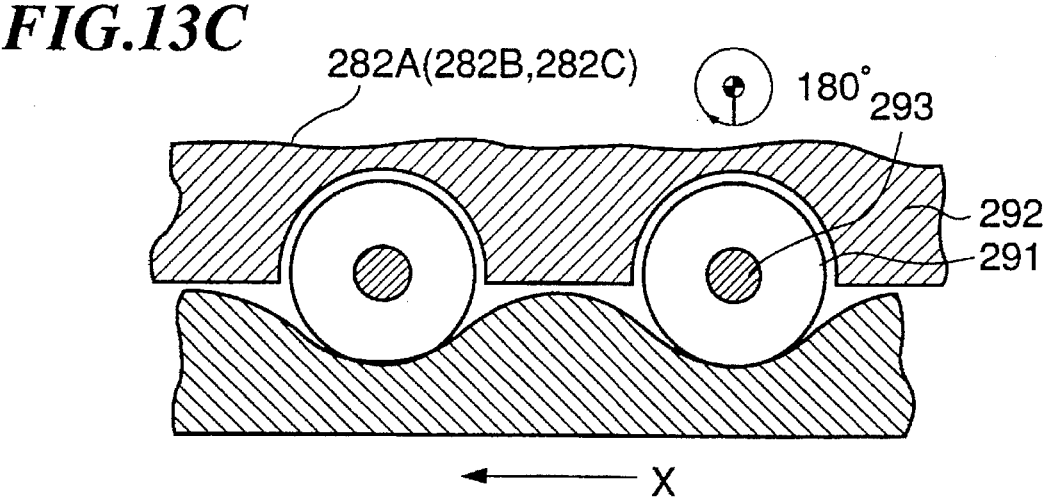

If the input shaft 288 is rotated by external drive means (not shown), the crankshafts 285A and 285B are driven to rotate. By the rotations of the crankshafts 285A and 285B, the active racks 282A, 282B and 282C are rotated while maintaining a predetermined phase difference. As the crankshafts 285A and 285B are rotated, the tooth T2 of the active rack 282A is oscillated as shown in FIGS. 13(a) to 13(c) and the passive rack 281 in which one side of the tooth T1 thereof is pushed by the tooth T2 is moved in its longitudinal direction X. Since the active racks 282A, 282B and 282C are oscillated while maintaining a predetermined phase difference determined by the number of the active racks, at least one of the active racks 282A, 282B and 282C is brought into engagement with the passive rack 281 at the above mentioned one side of the tooth T1 during one revolution of each of the crankshafts 285A and 285B. As a result, the passive rack 281 is caused to move in the linear direction X by the rotary motion of the active rack meshing with the passive rack. Therefore if the crankshafts 285A and 285B make one revolutions respectively, the passive rack 281 will be moved by one pitch P of the teeth T1 or T2. If, on the other hand, the rotary input to the input shaft 288 is reversed, the crankshafts 285A and 285B will be rotated in the opposite direction and the passive rack 281 moved in the direction opposite to the direction X.

Figure 14:
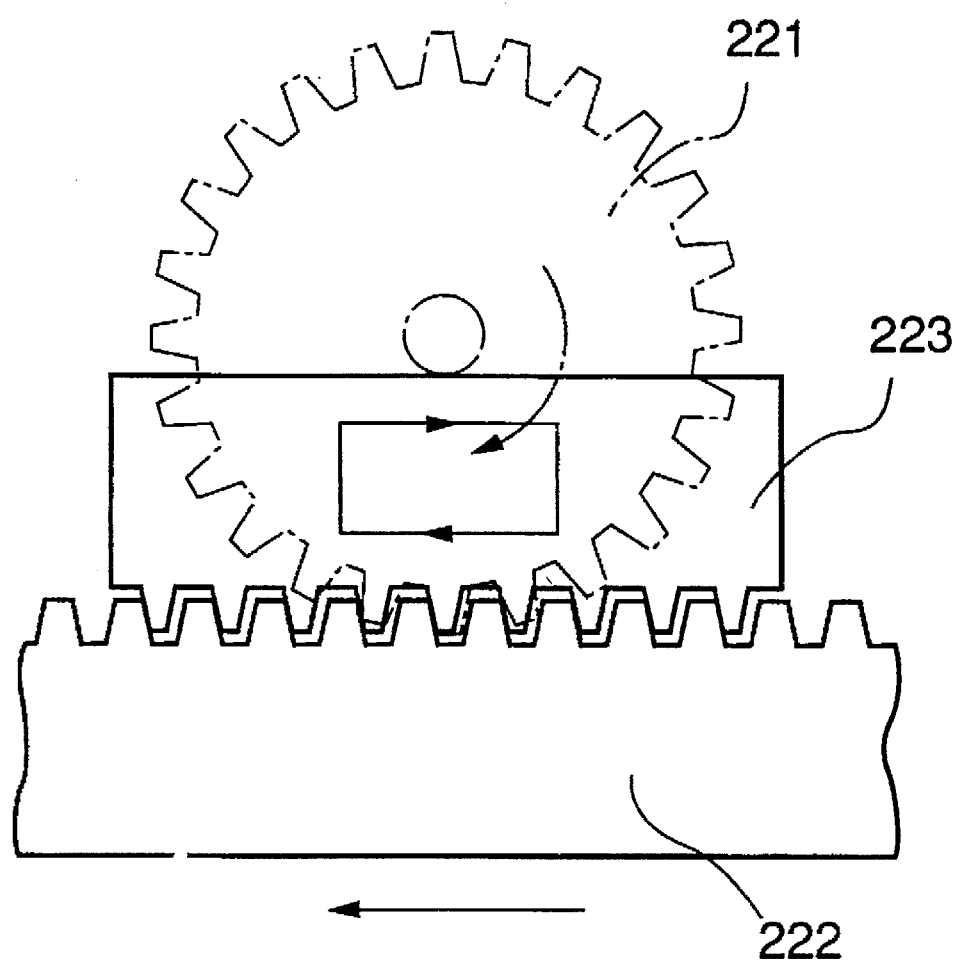
FIG. 14 is an explanatory side view comparing the number of concurrent meshing gears in a rack-pinion mechanism and an oscillating crank plate driven rack mechanism.

The reason why the electrically-driven thrust generators of the present invention has adopted the oscillating crank plate driven rack mechanism as a rotary motion to linear motion converting mechanism is that since the mechanism is compact the size of the electrically-driven thrust generator may be miniaturized as small as hydraulic cylinders which are competitive thrust generators. FIG. 14 shows a comparison between a rack pinion mechanism, which is a typical rotary motion to linear motion converting mechanism, and an oscillating crank plate rack mechanism. As shown in FIG. 14, the oscillating crank plate driven rack mechanism is superior in the number of concurrent meshing teeth. The rotary pinion 221 has only one or two teeth concurrently meshing with the rack 222, wherein only one is generally approved in design calculation. On the other hand, the oscillating crank plate 223 has eight teeth concurrently meshing with the rack 222, wherein six teeth are is generally approved in design calculation. Although three sets of oscillating crank plates 223 are necessary in the tooth width direction and this should be subtracted, oscillating crank plate has twice ((6×⅓)/2=2) as many concurrent meshing teeth as the rotary pinion 221 has.

Figure 2:
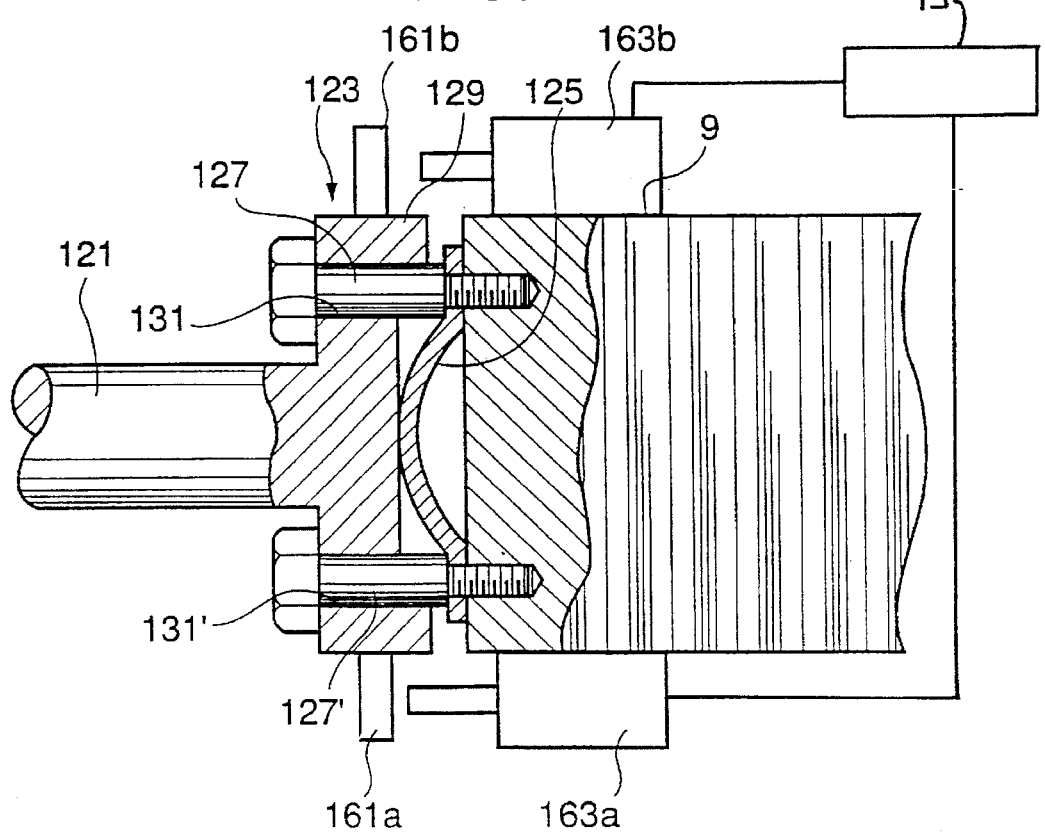
FIG. 2 is a detail view partly in section showing the elastic portion in the thrust rod of the electrically-driven thrust generator shown in FIG. 1.

FIG. 2 is a detail view partly in section showing the elastic portion 123 of the thrust rod 9 of the electrically-driven thrust generator shown in FIG. 1. The thrust rod head 121 is slidably supported in the lateral direction at pin holes 131, 131' formed at its flange portion 129 by two sets of pin bolts 127, 127', which are loosely fit in the pin holes 131. The pin bolts 127 are screwed and fixed to an end surface of the thrust rod 9.

A leaf spring 125 is interposed between the right end face of the thrust rod head 121 and the left end face of the thrust rod 9. This leaf spring 125 biases the thrust rod head 121 toward left. Accordingly, the left end face of the flange portion 129 of the head 121 contacts the head of the pin bolts 127. However, when a thrust toward right which is bigger than a certain level is applied to the head 121, the leaf spring 125 bends to allow the head 121 to move right. This bending of the leaf spring 125 softens a shock applied to the head 121 when the work touches the head 121. Additionally, during the leaf spring 125 is bending, the following sequential actions take place; the feeding of the thrust rod 9 is changed into low speed mode; the thrust rises up to a certain level (to an appropriate clamp force); the motor 3 is braked; and finally the motor 3 stops.

It is possible to detect the deflection of the elastic portion 123 in FIG. 2 and to switch the feeding of the thrust rod and stop the motor based on the deflection. For instance, the elastic portion 123 may be provided with the limit switch 163 and a position detecting plate 161a, 161b, and the limit switch 163b may detect the abutment of the work with the thrust head 121; the initiation of the deflection of the elastic portion 123; and the attainment of a predetermined thrust.

ADVANTAGEOUS EFFECT OF THE INVENTION

As clearly understood from the above explanations, the electrically-driven thrust generator of the present invention achieves the following advantageous effects:

(1) Electrical power consumption decreases since the generator requires little electricity during clamping;

(2) Oil leakage troubles are solved due to no pipings;

(3) Feed speed is changeable in high and low, thereby allowing swift and smooth clamping action;

(4) Desired thrust is obtained by installing a thrust detector; and (5) A compact electrically-driven thrust generator equivalent to a hydraulic cylinder is provided since an oscillating crank plate driven rack mechanism superior in the number of concurrent meshing teeth has been employed.

I claim:

1. An electrically driven thrust generator comprising:
   an electrically driven motor;
   a variable reduction ratio speed reducer for reducing rotation of the motor;
   a rotary motion to linear motion converting mechanism for converting rotary motion output from the speed reducer to linear motion; and
   a thrust rod linearly driven by the rotary motion to linear motion converting mechanism; wherein
   the thrust rod is disposed to contact an object to apply thrust to the object; and
   said rotary motion to linear motion converting mechanism comprises an oscillating crank plate driven rack mechanism.

2. An electrically driven thrust generator as set forth in claim 1, further comprising:
   a thrust detector for detecting the thrust applied by the thrust rod to the object to detect contact between the thrust rod and the object when the thrust reaches a first threshold value, and for detecting a desired thrust when the thrust reaches a second threshold value;
   a reduction ratio changer for maintaining a relatively low reduction ratio of said variable reduction ratio speed reducer so that the thrust rod is driven relatively rapidly, and for changing the reduction ratio of said variable reduction ratio speed reducer to a relatively higher ratio so that the thrust rod is fed relatively slowly; and
   a motor controller for stopping the motor when the desired thrust is achieved.

3. An electrically driven thrust generator as set forth in claim 2, further comprising a thrust reduction preventing device for preventing the thrust of the thrust rod from being reduced after the motor has stopped.

4. An electrically driven thrust generator as set forth in claim 1, further comprising a shock reducing device for reducing a shock generated when the thrust rod contacts the object.

5. An electrically driven thrust generator as set forth in claim 1, wherein said rotary motion to linear motion converting mechanism comprises:
   a passive rack with a plurality of teeth having a predetermined pitch;
   a plurality of active racks having a plurality of teeth having said predetermined pitch and meshing with said passive rack; and
   a plurality of rotatable crankshafts having eccentric circular portions which are different in phase from one another, said active racks being supported on said eccentric circular portions such that said passive rack is moved in a direction of a longitudinal axis of said passive rack through said active racks by rotary motion of said plurality of rotatable crankshafts.

6. An electrically driven thrust generator as set forth in claim 1, wherein said rotary motion to linear motion converting mechanism comprises:
   a passive rack with a plurality of teeth having wave gear-tooth profile and a predetermined pitch;
   a plurality of active racks having a plurality of teeth having said predetermined pitch and meshing with said passive rack, the teeth of said plurality of active racks each comprising a roller; and
   a plurality of rotatable crankshafts having eccentric circular portions different in phase from one another, said active racks being supported on said eccentric circular portions such that said passive rack is moved in a direction of a longitudinal axis of said passive rack through said active racks by rotary motion of said plurality of rotatable crankshafts.

7. An electrically driven thrust generator as set forth in claim 2, wherein said motor is elastically supported in its rotational direction, and said thrust detector detects a rotational angle of the motor to measure an output torque of the motor and a final thrust of the thrust rod.

8. An electrically driven thrust generator as set forth in claim 4, wherein said shock reducing device is an elastic member provided in the thrust rod.

9. An electrically driven thrust generator as set forth in claim 3, wherein said thrust reduction prevention device comprises a brake provided on the motor.

10. An electrically driven thrust generator as set forth in claim 1, wherein a high reduction ratio speed reducer mechanism of the variable reduction ratio speed reducer includes an elastic-spline speed reducer mechanism.

11. An electrically driven thrust generator as set forth in claim 2, wherein said reduction ratio changer includes a teeth clutch.

12. An electrically driven thrust generator as set forth in claim 2, wherein said thrust detector detects the thrust applied by the thrust rod by detecting shaft torque of the motor.

13. An electrically driven thrust generator as set forth in claim 2, wherein said thrust detector detects the thrust applied by the thrust rod by detecting the rotational angle of the motor.

14. An electrically driven thrust generator as set forth in claim 2, wherein said rotary motion to linear motion converting mechanism is provided with a hollow crank shaft therein and a changer rod of the reduction ratio changer of the variable reduction ratio speed reducer is located in the hollow crank shaft.

15. An electrically driven thrust generator comprising:

an electrically driven motor;

a variable reduction ratio speed reducer or reducing rotation of the motor;

a rotary motion to linear motion converting mechanism comprising an oscillating crank plate driven rack mechanism for converting rotary motion output from the speed reducer to linear motion;

a thrust rod linearly driven by the rotary motion to linear motion converting mechanism, the thrust rod being disposed to contact an object to apply thrust to the object;

a thrust detector for detecting the thrust of the thrust rod to detect contact between the thrust rod and the object when the thrust reaches a first threshold value, and for detecting a desired thrust when the thrust reaches a second threshold value;

a reduction ratio changer for maintaining a relatively lower reduction ratio of said variable reduction ratio speed reducer so that the thrust rod is driven relatively rapidly, and for changing the reduction ratio of said speed reducer to relatively higher ratio so that the thrust rod is driven relatively slowly;

a motor controller for stopping the motor when the desired thrust is achieved;

a thrust reduction preventing means for preventing the thrust of the thrust rod from being reduced after the motor has stopped;

a shock reducing means for reducing a shock generated when the thrust rod contacts the object.

16. An electrically driven thrust generator as set forth in claim 15, wherein said rotary motion to linear motion converting mechanism comprises:

a passive rack with a plurality of teeth having a predetermined pitch;

a plurality of active racks each having a plurality of teeth having said predetermined pitch and meshing with said passive rack; and a plurality of rotatable crankshafts each having eccentric circular portions which are different in phase from one another, said active racks being supported on said eccentric circular portions such that said passive rack is moved in a longitudinal direction of said passive rack through said active racks by rotary motion of said plurality of rotatable crankshafts.

17. An electrically driven thrust generator as set forth in claim 15, wherein said rotary motion to linear motion converting mechanism comprises:

a passive rack with a plurality of teeth having wave gear-tooth profile and a predetermined pitch;

a plurality of active racks having a plurality of teeth having said predetermined pitch and meshing with said passive rack, the teeth of said plurality of active racks each comprising a roller; and a plurality of rotatable crankshafts having eccentric circular portions different in phase from one another, said active racks being supported on said eccentric circular portions such that said passive rack is moved in a direction of a longitudinal axis of said passive rack through said active racks by rotary motion of said plurality of rotatable crankshafts.

18. An electrically driven thrust generator as set forth in claim 15, wherein said motor is elastically supported in its rotational direction, and said thrust detector detects the rotational angle of the motor to measure an output torque of the motor and a final thrust of the thrust rod.

19. An electrically driven thrust generator as set forth in claim 15, wherein said shock reducing means includes an elastic member provided in the thrust rod.

20. An electrically driven thrust generator as set forth in claim 15, wherein said thrust reduction preventing means comprises a brake provided on the motor.

21. An electrically driven thrust generator as set forth in claim 15, wherein a high reduction ratio speed reducer mechanism of the variable reduction ratio speed reducer includes an elastic-spline speed reducer mechanism.

22. An electrically driven thrust generator as set forth in claim 15, wherein said reduction ratio changer includes a teeth clutch.

23. An electrically driven thrust generator as set forth in claim 15, wherein said thrust detector directly detects the thrust applied by the thrust rod by detecting shaft torque of the motor.

24. An electrically driven thrust generator as set forth in claim 15, wherein said thrust detector detects the thrust applied by the thrust rod by detecting the rotational angle of the motor.

25. An electrically driven thrust generator as set forth in claim 15, wherein said rotary motion to linear motion converting mechanism is provided with a hollow crank shaft therein and a changer rod of the reduction ratio changer of the variable reduction ratio speed reducer is located in the hollow crank shaft.

* * * * *